United States Patent [19]

Herrmann et al.

[11] Patent Number: 4,895,681

[45] Date of Patent: Jan. 23, 1990

[54] FATTY ACID ESTERS OF POLYGLYCEROL POLYGLYCOL ETHERS, THEIR PRODUCTION AND USE

[75] Inventors: Klaus Herrmann, Monheim; Leonhard Wittich, Langenfeld, both of Fed. Rep. of Germany

[73] Assignee: Henkel Kommanditgesellschaft auf Aktien, Duesseldorf, Fed. Rep. of Germany

[21] Appl. No.: 287,686

[22] Filed: Dec. 20, 1988

Related U.S. Application Data

[63] Continuation of Ser. No. 111,386, Oct. 21, 1987, abandoned.

[30] Foreign Application Priority Data

Oct. 23, 1986 [DE] Fed. Rep. of Germany ....... 3636086

[51] Int. Cl.$^4$ .............................................. C07C 67/76
[52] U.S. Cl. .............................. 260/410.6; 260/410.7; 252/321; 252/358
[58] Field of Search ........................... 260/410.6, 410.7; 252/321, 358

[56] References Cited

U.S. PATENT DOCUMENTS

| | | | |
|---|---|---|---|
| 3,078,236 | 2/1963 | Hwa | 252/321 |
| 3,337,595 | 8/1967 | Lamont et al. | 260/410.6 |
| 3,408,300 | 10/1968 | Schlüssler et al. | 252/156 |
| 3,491,029 | 1/1970 | Kasperl et al. | 252/156 |
| 4,209,333 | 6/1980 | Ong et al. | 106/25 |
| 4,522,740 | 6/1985 | Schmid et al. | 252/174.21 |
| 4,600,523 | 7/1986 | Piorr et al. | 252/174.21 |
| 4,681,900 | 7/1987 | Iwasaki | 260/410.6 |
| 4,745,231 | 5/1988 | Lange et al. | 568/624 |

FOREIGN PATENT DOCUMENTS 2360020 8/1982 Fed. Rep. of Germany .

OTHER PUBLICATIONS

Fett Wissenschaft Technologie/Fat Science Technology, 1987, März, No. 3, Leinfelden-Echterdingen, W. Germany, pp. 106–111.

*Primary Examiner*—Bruce Gray
*Attorney, Agent, or Firm*—Ernest G. Szoke; Wayne C. Jaeschke; Real J. Grandmaison

[57] ABSTRACT

Fatty acid esters of polyglycerol polyglycol ethers obtained by reaction of polyglycerols in known manner with ethylene oxide and propylene oxide and esterification of the alkylene oxide adduct obtained with fatty acids, containing from 2 to 15 moles ethylene oxide, from 10 to 60 moles propylene oxide and from 1 to 3 moles fatty acid being used per mole of hydroxyl groups in the polyglycerol, are effective as foam inhibitors.

8 Claims, No Drawings

FATTY ACID ESTERS OF POLYGLYCEROL POLYGLYCOL ETHERS, THEIR PRODUCTION AND USE

This application is a continuation, of application Ser. No. 07/111,386, filed 10/21/87, abandoned.

BACKGROUND OF THE INVENTION

1. Field of the Invention

This invention relates to adducts of ethylene oxide and propylene oxide with technical grade polyglycerols esterified with fatty acids, to a process for their production and to their use as foam inhibitors.

2. Discussion of Related Art

Glycerol and polyglycerol polypropylene glycol ethers are known compounds. According to German Patent Application Nos. 12 61 618, 12 80 455, 23 60 020 and U.S. Pat. No. 3,078,236, they are used as foam inhibitors in washing and cleaning solutions.

Polyglycerol polyethylene glycol/polypropylene glycol ethers distinguished by superior foam-inhibiting properties have been discovered in the course of efforts to develop foam inhibitors having improved performance properties.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to fatty acid esters of polyglycerol ethers which may be obtained by reaction of polyglycerols in known manner with ethylene oxide and propylene oxide and esterification of the alkylene oxide adduct obtained with fatty acids using from 2 to 15 moles ethylene oxide, from 10 to 60 moles propylene oxide and from 1 to 3 moles fatty acid per mole of hydroxyl groups in the polyglycerol.

The present invention also relates to a process for the production of fatty acid esters of polyglycerol polyglycol ethers, wherein polyglycerols are reacted in known manner with ethylene oxide and propylene oxide in the presence of an acidic or alkaline alkoxylation catalyst and the alkylene oxide adduct obtained is esterified with fatty acids, optionally in the presence of an esterification catalyst, and wherein from 2 to 15 moles ethylene oxide, from 10 to 60 moles propylene oxide and from 1 to 3 moles fatty acid are used per mole of hydroxyl groups in the polyglycerol.

Finally, the invention relates to the use of the fatty acid esters of polyglycerols described above as foam inhibitors in aqueous compositions.

The glycerol oligomers which have recently become available, namely diglycerol, triglycerol and also linear or branched tetraglycerol, may be used as a starting material for the production of the fatty acid esters according to the invention. In general, however, the fatty acid esters according to the invention are produced from technical grade polyglycerols, i.e. mixtures of a number of glycerol oligomers. Technical grade polyglycerols such as these may be obtained in known manner by condensation of glycerol at elevated temperature and reduced pressure in the presence of alkaline catalysts and in the absence of air and subsequent removal of the catalyst with ion exchangers. The average degree of polymerization may be controlled through the reaction conditions, more especially through the heating time. In addition to a certain proportion of uncondensed glycerol, the products obtained in this way contain virtually all oligomers up to the particular maximum degree of polymerization reached which may assume values of up to 30. The fatty acid esters according to the invention are preferably produced from technical grade polyglycerols which contain the glycerol oligomers from diglycerol up to heptaglycerol and, in addition, up to 20% by weight of monomeric glycerol. In addition, technical grade polyglycerols of the type herein also accumulate as distillation residues in the industrial production of glycerol. Technical grade polyglycerols having a hydroxyl number of from 900 to 1100 are preferably used.

To produce the fatty acid esters according to the invention, the polyglycerol selected as starting material is first reacted with ethylene oxide and propylene oxide. The alkoxylation product is then reacted with fatty acid.

The alkoxylation may be carried out by reacting the polyglycerol with the intended quantities of ethylene oxide and propylene oxide at one and the same time in a random polymerization. In addition, the polyglycerol may be reacted first with one of the alkylene oxides and then with the other either in the order ethylene oxide-propylene oxide or in the order propylene oxide ethylene oxide. The alkoxylation may also be carried out as a block polymerization with parts of the ethylene oxide and/or propylene oxide, for example in the order propylene oxide-ethylene oxide-propylene oxide. In one preferred embodiment of the invention, the polyglycerol is reacted first with ethylene oxide and then with propylene oxide. In another preferred embodiment, the polyglycerol is reacted simultaneously with ethylene oxide and propylene oxide.

The alkoxylation is carried out by methods known per se, preferably under pressure and at elevated temperature, for example at 80° to 200° C., in the presence of an acidic or alkaline catalyst. The addition of ethylene oxide is preferably carried out at 165° to 185° C., while the addition of propylene oxide is preferably carried out at 115° at 135° C. In cases where ethylene oxide and propylene oxide are simultaneously reacted with the polyglycerol, the reactants are preferably allowed to react with one another at 115° to 135° C. Suitable acidic catalysts include for example, Lewis acids, such as boron trifluoride and aluminum chloride. However, it is preferred to use an alkaline catalyst, such as an alcoholate, hydroxide, oxide, carbonate, hydride or amide of the alkali metal and alkaline earth metals. Alcoholates of sodium, for example sodium methylate and sodium ethylate, and also sodium and potassium hydroxide are particularly preferred. The catalyst is used in a quantity of from 0.05 to 3% by weight, and preferably in a quantity of from 0.1 to 1% by weight, based on the total quantity of polyglycerol and alkylene oxides. On completion of the reaction, the catalyst is inactivated by neutralization with mineral acid or a suitable organic acid, for example lactic acid, or is removed from the reaction product by stirring with an acidic clay and subsequent filtration.

In one preferred embodiment of the invention, the polyglycerol is reacted successively or simultaneously with from 5 to 10 moles ethylene oxide and from 15 to 35 moles propylene oxide per mole of hydroxyl groups in the polyglycerol.

In another preferred embodiment of the invention, the molar ratio of ethylene oxide to propylene oxide in the reaction of the polyglycerol with the alkylene oxides is from 1:2 to 1:3.5.

Straight-chain and/or branched, saturated and/or unsaturated fatty acids containing from 8 to 22 carbon atoms are suitable for esterification of the above-described adduct of ethylene oxide and propylene oxide with polyglycerols. Where unsaturated fatty acids are used, they may contain from 1 to 4 carbon-carbon double bonds. Examples of suitable fatty acids include caprylic acid, capric acid, lauric acid, myristic acid, palmitic acid, stearic acid, arachic acid, behenic acid, palmitoleic acid, oleic acid, erucic acid, linoleic acid, linolenic acid, arachidonic acid, ethylhexanoic acid, isopalmitic acid and isostearic acid. The polyglycerol polyglycol ethers to be esterified may be reacted both with individual fatty acids and also with fatty acid mixtures, in which case they are reacted preferably with fatty acid mixtures of the type which accumulate during the cleavage of naturally occurring fats and oils on an industrial scale. In this case, preference is attributed to certain fatty acid fractions, for example to the so-called precut fatty acids which are obtained primarily in the separation of the fatty acids of coconut oil or palm kernel oil by distillation and which consist predominantly of saturated fatty acids containing from 8 to 10 carbon atoms. Of quite particular interest as the esterification component are technical grade oleic acids of the type obtainable from the fatty acid mixtures of natural fats and oils, for example those of beef tallow and palm oil, by the hydrophilization process of fatty acid separation. These technical grade oleic acids comprise predominantly $C_{16}$–$C_{18}$ fatty acids, of which a large proportion is mono- or poly-unsaturated. Precut fatty acids on the one hand and technical grade oleic acids on the other hand are of particular importance since their esters with polyglycerol polyalkylene glycol ethers are generally liquid at room temperature.

In the esterification of the polyglycerol polyethylene glycol/polypropylene glycol ethers, the fatty acids are used in a molar ratio of from 1:1 to 1:3, based on 1 mole of hydroxyl groups in the starting polyglycerol. The fatty acid is preferably used in the esterification in a stoichiometric excess over the hydroxyl groups present in the starting material and also in an excess over the hydroxyl groups actually present in the polyglycerol polyglycol ether. In one preferred embodiment of the invention, the alkylene oxide adduct of the polyglycerol to be esterified is reacted with from 1.1 to 2 moles fatty acid per mole of hydroxyl groups in the polyglycerol.

The esterification of the polyglycerol polyglycol ethers is carried out by methods known per se in organic synthesis. The reactants are best allowed to react with one another at 180° to 250° C., preferably in an inert gas atmosphere, the water formed during the reaction being distilled off. The esterification may be carried out in the absence of a catalyst. In general, however, a known esterification catalyst, for example tin powder or titanic acid ester, is added to the reaction mixture to keep the reaction time within economically reasonable limits. For purification and, optionally, for removal of the catalyst, the resulting fatty acid esters may be filtered, if desired using a filtration aid, preferably at elevated temperature. There is normally no need for further refining before the application under consideration.

The fatty acid esters of polyglycerol polyethylene glycolpolypropylene glycol ethers according to the invention are viscous liquids which normally show a more or less strong yellowish coloration. Depending on the excess of fatty acid used in the esterification, the products contain a certain quantity of free fatty acid which does not impair the foam-inhibiting effect of the products. The products are self-emulsifying and may be used either directly or after dispersion in water or dissolution in organic solvents, for example low molecular weight alcohols. They may also be mixed with extenders, dispersants or other foam inhibiting compounds and used in that form. Examples of auxiliaries such as these include polyglycol ether derivatives of alcohols or fatty acids, fatty acid esters and paraffins or paraffin oils.

They may also be applied to carrier particles consisting of an absorbent material and used in that form, for example as pourable and free-flowing adsorbates. Suitable carrier materials include, for example, free-flowing, more especially spray-dried, salts, such as sulfates, carbonates, phosphates, polyphosphates, silicates and borates of sodium or magnesium, finely-divided silicon dioxide (kieselguhr, Aerosile), aluminum oxide, finely-divided clays, bentonites and aluminosilicates and also mixtures of these adsorbents.

The fatty acid esters according to the invention and their preparations are highly effective foam inhibitors and are suitable for numerous applications, more especially in the food industry and in chemical process engineering. Examples of these applications include the sugar industry (foam inhibition of molasses), the fermentation industry (foam inhibition of yeast and enzyme solutions), the starch industry (production of potato starch) and the production of phosphoric acid from mineral phosphates. Further applications include industrial cleaning preparations and cleaning processes, more especially for spray cleaning and bottle washing, and as low-foam wetting agents or as foam inhibitors in polymerization reactions.

The particular value of the fatty acid esters according to the invention is that their foam-inhibiting effect is independent of temperature over a wide range and in that they retain their foam-inhibiting effect for long periods of time. In many technical processes, the solutions with a tendency to foam are exposed to intensive mechanical agitation and to elevated temperatures for prolonged periods, as for example in evaporation processes in which the solution is vigorously recirculated. Although there are many known foam inhibitors which produce spontaneous collapse of the foam in cases such as these, their foam-inhibiting effect abates after a short time and foam builds up again. Other products destroy the foam relatively slowly, but provide long-lasting foam inhibition. The inhibitors according to the invention are distinguished both by a high spontaneous effect and also by a lasting long-term effect. They have the major advantage over numerous silicone-based or paraffin-based foam inhibitors that they do not hydrophobicize the substrate.

EXAMPLE

I. Production of the fatty acid esters of polyglycerol polyglycol ethers (a) In a lift-stirrer autoclave, 292 g of polyglycerol(-hydroxyl number approx. 1000; corresponding to 5.53 moles of hydroxyl groups) were mixed with 6 g of potassium hydroxide in the form of a 30% by weight solution in methanol. The methanol introduced with the catalyst was removed by heating in vacuo to 100° C. The mixture was then heated to 150° C. and ethylene oxide pumped into the autoclave where it reacted almost immediately with the polyglycerol, the temperature of the mixture rising to around 170° C. Ethylene oxide was then continuously introduced at such a rate that the reaction temperature remained between 170° and 180° C. and the pressure in the autoclave did not exceed 4.5 bar. A total of 1708 g (38.7 moles) of ethylene oxide was reacted with the polyglycerol in this way. After the reaction had abated, as reflected in the fall in temperature and pressure, the mixture was stirred for another 30 minutes at 170° C. and then cooled.

The reddish-brown ethoxylate obtained had a hydroxyl number of 165 and an alkali number of 3.7.

(b) 551 g of the adduct of ethylene oxide with polyglycerol obtained in accordance with (a) (corresponding to 1.53 moles of hydroxyl groups) were mixed in a lift-stirrer autoclave with 4.6 g of potassium hydroxide in the form of a 30% by weight solution in methanol. The methanol introduced with the catalyst was removed by heating in vacuo to 100° C. The mixture was then heated to 120° C. and propylene oxide pumped into the autoclave where it reacted immediately with the polyglycerol polyethylene glycol ether. Propylene oxide was then continuously introduced at such a rate that the temperature of the reaction mixture remained between 120° and 130° C. and the pressure in the autoclave did not exceed 4.5 bar. A total of 1949 g (33.6 moles) of propylene oxide was reacted in this way. After the reaction had abated, the mixture was stirred for 30 minutes at 120° C. and then cooled. To inactivate the catalyst, the reaction product was adjusted to pH 7 by addition of lactic acid.

The resulting brown-colored ethoxylate/propoxylate had a hydroxyl number of 48.

(c) In a stirrer-equipped three-necked flask surmounted by a distillation bridge, 384 g of the adduct of ethylene oxide and propylene oxide with polyglycerol obtained in accordance with b) (corresponding to 0.33 mole of hydroxyl groups), 133 g (0.475 mole) of technical grade oleic acid (saturated: 1% $C_{12}$; 3% $C_{14}$; 0.5% $C_{12}$; 5% $C_{16}$; 1% $C_{17}$; 2% $C_{18}$; monounsaturated: 6% $C_{16}$; 70% $C_{18}$; diunsaturated: 10% $C_{18}$; triunsaturated: 0.5% $C_{18}$; figures in percent by weight; acid number 199–204; saponification number 200–205; iodine number 88–96) and 1 g of tetraisopropyl orthotitanate were heated with stirring under nitrogen to 240° C. and kept at that temperature for 3.5 hours. 10.5 ml of distillate containing 5.0 ml of water were obtained. The reaction mixture was cooled to 70° C. and, after addition of 20 g of fuller's earth, was filtered. 502 g of fatty acid ester of a polyglycerol polyethylene glycol/polypropylene glycol ether (product 1) having the following characteristic data were obtained: acid number 14; hydroxyl number 12.2; saponification number 51.4; density at 70° C. 0.9570; pour point −20° C.

II. Performance testing

The foam test was carried out as follows:

A measured test solution was transferred to a graduated standing cylinder with a capacity of 5 liters. By means of an impeller pump, the solution was taken in at the bottom of the standing cylinder and pumped to an outlet pipe which terminates level with the upper edge of the standing cylinder. The solution re-enters the standing cylinder by free fall and generates foam as it impinges on the liquid surface. After a short time, a constant foam height and hence a starting foam volume useful for further measurement are established.

The foam inhibitor to be tested was dissolved in an inert solvent (5% by weight solution in dioxane) and applied dropwise to the column of foam from a micropipette. The foam volume was measured at certain intervals with the impeller pump remaining on. The presentation of these measured values in the form of a table provides information on the spontaneous foam collapse and the long-term effect of the tested foam inhibitor.

Inhibitors in the application of which the foam, although collapsing spontaneously, largely builds up again after a short time may thus be identified as unusable or unsuitable. The same applies to inhibitors which have a good long-term effect, but lack substantial effectiveness in terms of spontaneous foam collapse.

In addition to product 1 according to the invention, the following compounds which have previously been used or described as suitable for similar purposes were tested for comparison (abbreviations: EO = added ethylene oxide, PO = added propylene oxide):

(A) polyglycerol + 22 PO
(B) polypropylene glycol (MW = 2020)
(C) tallow alcohol + 2 EO + 4 PO
(D) oleic acid + 3 EO
(E) distillation residue from oxoalcohol synthesis (hydroxyl number approx. 150) + 15% by weight EO + 41% by weight PO
(F) oleic acid + 1 PO
(G) polyglycerol (hydroxyl number approx. 1000) + 7 EO + 22 EO The following test solutions were used:
(a) 100 g of potato pulp produced by fine grinding from raw potatoes dispersed in 400 ml of water,
(b) 100 ml of molasses in 400 ml of water.

Quantities of 0.05 ml of a solution of 5 g of foam inhibitor in 95 g of dioxane were used, corresponding to a quantity of 5 mg of foam inhibitor to 1 liter of substrate solution. The temperature of the test solution was 25° C.

| III. Results of performance tests (1) Test solution a, initial foam volume 2000 ml | | | | | | |
|---|---|---|---|---|---|---|
| | Foam volume after minutes | | | | | |
| Inhibitor | 0.5 | 1 | 2 | 5 | 10 | 20 |
| Product 1 | 700 | 600 | 600 | 600 | 620 | 740 |
| E | 1120 | 960 | 800 | 720 | 740 | 960 |
| G | 2000 | 2000 | 2000 | terminated | | |

The fatty acid ester (product 1) according to the invention is shown to be superior to the comparison products in all ranges.

| (2) Test solution b, initial foam volume 2000 ml | | | | | | | |
|---|---|---|---|---|---|---|---|
| | Foam volume after minutes | | | | | | |
| Inhibitor | 0.5 | 1 | 2 | 5 | 10 | 20 | 30 |
| Product 1 | 500 | 540 | 580 | 640 | 720 | 800 | 840 |
| A | 700 | 680 | 680 | 780 | 880 | 1200 | 1480 |
| B | 780 | 800 | 880 | 1000 | 1100 | 1200 | 1600 |
| C | 600 | 600 | 680 | 820 | 940 | 1040 | 1180 |
| D | 1500 | 1220 | 1100 | 1120 | 1120 | 1120 | 1180 |
| E | 1100 | 820 | 760 | 800 | 820 | 920 | 980 |
| F | 960 | 800 | 760 | 800 | 820 | 920 | 980 |

Although a number of the comparison inhibitors, namely A, B and C, act spontaneously, their long-term effect is inadequate. Although comparison inhibitors D, E and F are still effective after a relatively long time, their spontaneous foam collapse is too weak. The inhibitor according to the invention shows balanced behavior in regard to spontaneous and long-term effectiveness.

We claim:

1. A foam inhibitor for aqueous systems comprising a fatty acid ester of polyglycerol polyglycol ether obtained by first reacting a polyglycerol with from about 2 to about 60 moles of ethylene oxide and from about 10 to about 60 moles of propylene oxide, and then esterifying the resulting alkylene oxide adduct with a $C_8$–$C_{22}$ fatty acid using from about at least 1 to about 3 moles of fatty acid per mole of hydroxyl groups in said polyglycerol.

2. A foam inhibitor as in claim 1 wherein said polyglycerol is reacted first with said ethylene oxide and then with said propylene oxide.

3. A foam inhibitor as in claim 1 wherein said polyglycerol is reacted simultaneously with said ethylene oxide and said propylene oxide.

4. A foam inhibitor as in claim 1 wherein said aldylene oxide adduct is esterified with a saturated or unsaturated $C_8$–$C_{22}$ fatty acid.

5. A foam inhibitor as in claim 1 wherein said alkylene oxide adduct is esterified with a fatty acid containing from about 16 to about 18 carbon atoms.

6. A foam inhibitor as in claim 1 wherein said polyglycerol is reacted with from about 5 to about 10 moles ethylene oxide and from about 15 to about 35 moles propylene oxide per mole of hydroxyl groups in said polyglycerol.

7. A foam inhibitor as in claim 1 wherein the molar ratio of ethylene oxide to propylene oxide in the reaction with said polyglycerol is from about 1:2 to about 1:3.5.

8. A foam inhibitor as in claim 1 wherein said alkylene oxide adduct is reacted with from about 1.1 to about 2 moles fatty acid per mole of hydroxyl groups in said polyglycerol.

* * * * *

UNITED STATES PATENT AND TRADEMARK OFFICE
CERTIFICATE OF CORRECTION

PATENT NO. : 4,895,681

DATED : January 23, 1990

INVENTOR(S) : Klaus Herrmann et al.

It is certified that error appears in the above-identified patent and that said Letters Patent is hereby corrected as shown below:

In Claim 1, Column 7, line 7, "60 moles" should read --15 moles--.

In Claim 4, Column 8, line 1, "aldy-" should read --alky--.

Signed and Sealed this

Nineteenth Day of March, 1991

Attest:

HARRY F. MANBECK, JR.

*Attesting Officer*  *Commissioner of Patents and Trademarks*